United States Patent [19]

Bailey

[11] 4,402,383

[45] Sep. 6, 1983

[54] DRILL MOTOR ENCLOSURE

[75] Inventor: Edward A. Bailey, Newport, N.H.

[73] Assignee: Joy Manufacturing Company, Pittsburgh, Pa.

[21] Appl. No.: 298,400

[22] Filed: Sep. 1, 1981

[51] Int. Cl.³ .......................... H02K 5/24; F01N 1/24; F16F 7/00
[52] U.S. Cl. .................................. 181/202; 181/207; 181/230; 181/264
[58] Field of Search ............................... 181/200–204, 181/207, 230, 239, 264; 248/638, 672, 556, 557, 562, 566, 633

[56] References Cited

U.S. PATENT DOCUMENTS 3,332,504 7/1967 Lowery .......................... 181/230 X
3,599,756 8/1971 Pickle .................................. 181/230
3,667,571 6/1972 Fattelay ............................. 181/230

Primary Examiner—Benjamin R. Fuller
Attorney, Agent, or Firm—Raymond W. Augustin

[57] ABSTRACT

A drill motor rigid enclosure is provided for a rock drill motor. The drill motor is encompassed within the enclosure such that viration, torque, and thrust produced by the motor is isolated from the rigid enclosure, therefore noise reduction of the drill motor is achieved.

18 Claims, 5 Drawing Figures

DRILL MOTOR ENCLOSURE

This invention relates to a rigid enclosure for a drill motor used to actuate a drill rod in drilling holes in rock, earth strata or the like to reduce the level of noise radiated by the operation of the drill motor to the area surrounding the drill motor.

The present invention will be described for the embodiment of a mobile drilling machine jumbo face drill, however, it will be readily apparent to those skilled in the art that the present invention may be used on other rock drills, mobile or stationary, face or deep hole or conventional or jumbo sized. It will also be readily apparent to those skilled in the art that the present invention may be used on rotary rock drills as well as percussion rock drills as described below.

Various mobile drilling machines are commonly referred to as jumbo drills and, although the design of various jumbo drills may vary, essentially all such jumbo drills utilize a drill motor having a reciprocable hammer piston to deliver impact blows to a striking bar or anvil which striking bar is connected to the drill rod so that the drill rod is progressively driven into the strata to be drilled. Such pistons, striking bars and drill rods are metallic members with the drill rod, due to its length, being supported by one or more metallic guides, supports or centralizers. The guides, supports or centralizers are also often metallic. Consequently, jumbo drills produce a great deal of noise, such as 112 dBA or above, which is highly undesirable from an industrial health standpoint. In addition, the U.S. Government agency, OSHA, has issued standards regarding industrial noise levels which require that a worker not be exposed to a continuously generated noise in excess of 90 dBA (when measured at ear level) for a time weighted average over an eight hour working day. With regard to jumbo drills the standards require a halving of the exposure to noise level per each 5 dBA increase of noise level, that is, four hours per working day at 95 dBA, two hours at 100 dBA and so on up to a maximum of fifteen minutes at 115 dBA.

BRIEF SUMMARY OF THE INVENTION

The present invention is to a rigid enclosure which encompasses a drive motor for actuating a drill rod so that the noise generated by the operation of the drive motor and normally transmitted to the environmental air surrounding the drill motor is substantially reduced so that the noise level to which the operator of the drill is exposed is at a more acceptable level. To obtain such noise transmission reduction the exterior of the housing of the drill motor is encompassed in a resilient enclosure such that all the vibration, thrust and torque produced by the drill motor is isolated from the rigid enclosure. The rigid enclosure is also provided with an internal muffling structure to reduce the exhaust noise from the drill motor. All auxiliaries connected to the rigid enclosure are provided with noise reducing connections to further reduce the noise level emanating from the rigid enclosure and the drill motor.

Accordingly, one object of this invention is to provide a rigid enclosure for enclosing a drill motor with an intervening noise dampening means.

Another object of this invention is to provide a rigid enclosure for enclosing a drill motor with an intervening noise dampening means and a noise dampening means for muffling the exhaust from the drill motor.

Still another object of this invention is to provide a rigid enclosure for enclosing a drill motor with an intervening noise dampening means which dampening means isolates the vibrations, thrust and torque produced by the drill motor from the rigid enclosure.

A further object of this invention is to provide a rigid enclosure for enclosing a drill motor with an intervening noise dampening means and a pressurizable chamber means is located between the back end of said drill motor and said rigid enclosure.

DETAILED DESCRIPTION

Figure 1:
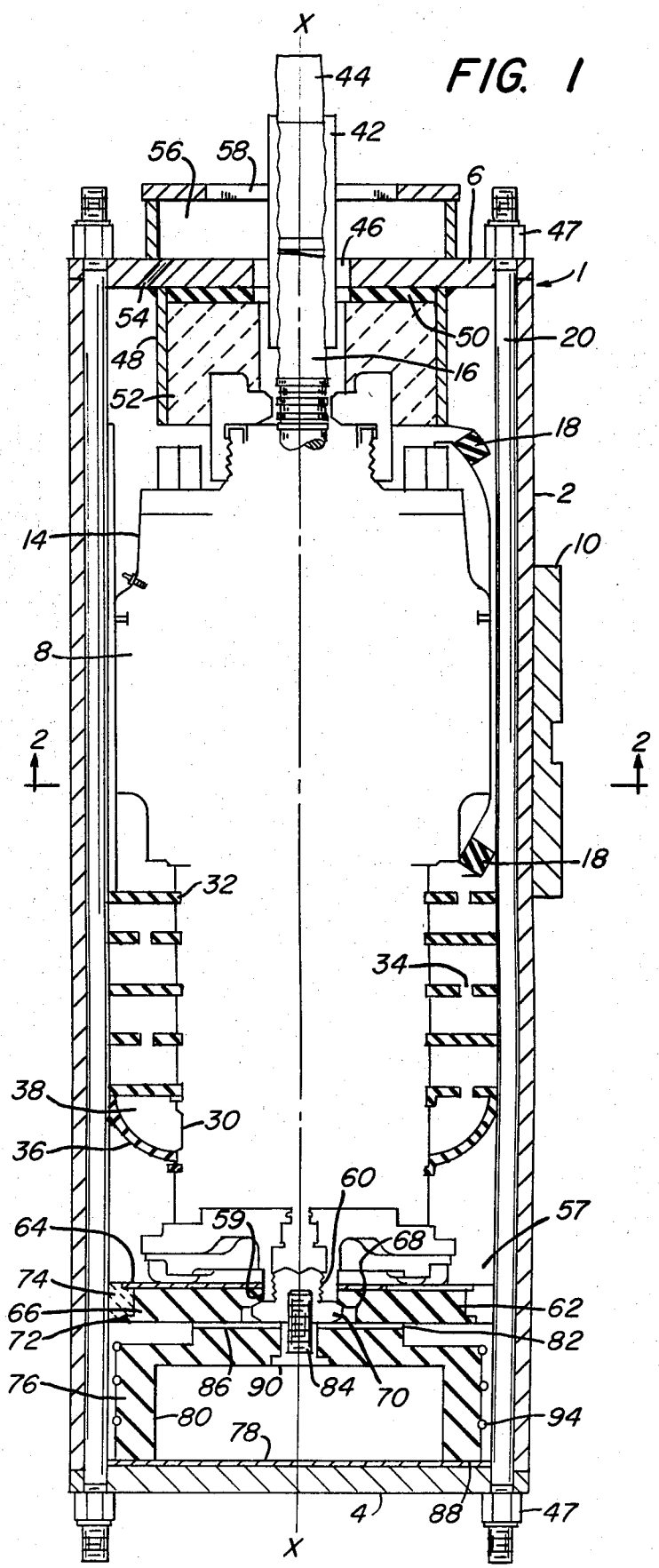
FIG. 1 is a cross sectional side view of a drill motor enclosure constructed in accordance with the principles of this invention with a drill motor being supported therein.

The drill motor enclosure of this invention comprises a formed housing 1 having various components secured together to provide a rigid housing. Housing 1 can be of various suitable forms and, as shown (FIG. 1), comprises an elongated horizontally extending outer shell 2 having a rearward back closure plate 4 and a forward front closure plate 6 to form a closed end tubular chamber for receiving a drill motor 8 therein. The lower circular outer periphery of shell 2 is suitably rigidly secured, such as by welding, to a horizontally extending mounting pad 10 to permit the housing 1 to be slidably supported on a feed boom (not shown) of a mobile drilling machine as is well known in the art. Suitable side supports 12 are suitably rigidly secured, such as by welding, to the lower periphery of the shell 2 and the upper surface of pad 10 to enhance the rigid connection between the shell 2 and pad 10.

The illustrated drill motor 8 is of any one of a number of suitable drill motors commercially available; however, as will become apparent the noise isolating means which is located between the exterior of the motor 8 and the interior of shell 2 will vary in configuration to accommodate the variations in the outer configuration of the particular drill motor 8 selected. Drill motor 8 has an elongated housing 14 with a striking bar 16 extending forwardly outwardly from the forward end of motor housing 14. Motor housing 14 and striking bar 16 have a coincident central axis and, when motor 8 is supported in housing 1 as hereinafter described, the central axis of housing 1 and motor housing 14 are preferably coincident which common coincident central axis is shown as X—X. Such coincidence of the central axes is preferred; however, it is not essential for this invention. Suitable means are provided for maintaining the motor 8 in a spaced relationship with the formed housing 1. The means for maintaining the motor 8 in a spaced relationship with the housing 1 consists of a front stabilizer means and a rear stabilizer means described hereafter and a shell spacer means. Pad 18 of FIG. 1 serves as this shell power means for maintaining the motor in a spaced relationship with shell 2, however, the pad does not have to totally encompass the drill motor housing 14 to accomplish the above. With drill motor 8, FIG. 1 located within shell 2 intermediate the ends of shell 2 as shown, the drill motor 8 is maintained in spaced relationship with the interior of shell 2 by means of an encompassing blanket or pad 18 which is formed from a resilient material having sufficient structural strength to achieve the functions as hereinafter described. Pad 18 can be a single member which is wrapped around the motor housing 14 prior to insertion of the drill motor 8 in shell 2. Pad 18 can also be semicircular halves encompassing motor housing 14 or formed portions encompassing only selected portions of motor housing 14. As few as 2 sections may be used. Regardless of whether pad 18 is a one, two or multi-space structure appropriate openings and dimensions must be provided to locate the pad 18 as described hereinafter.

Figure 2:
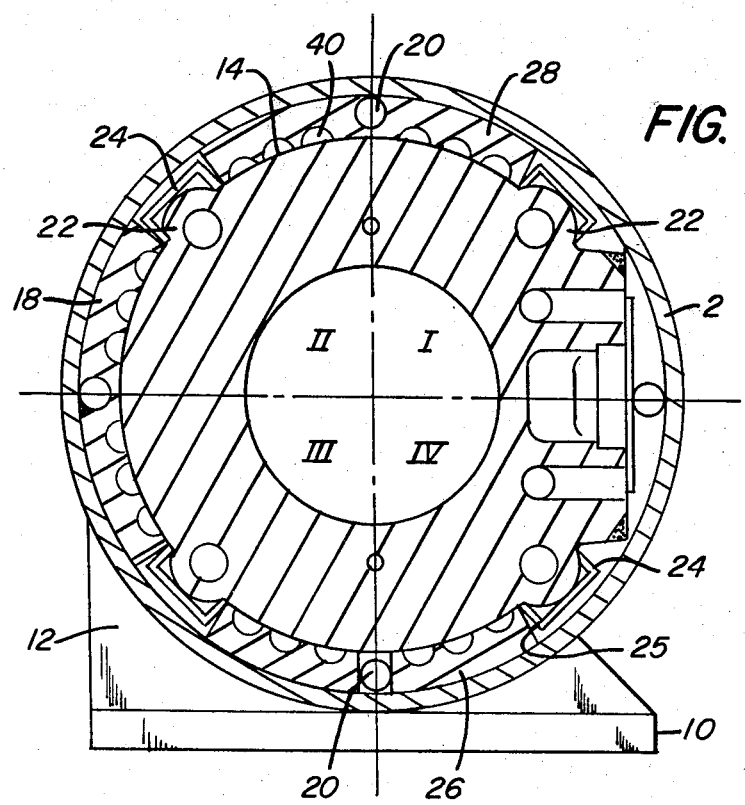
FIG. 2 is a cross sectional view taken along line A—A thereof.

Drill motor 8, when inserted in shell 2, has its forward end located inwardly of the forward end of shell 2. When located in motor housing 14, drill motor 8, during operation, will vibrate, and unless restrained will rotate and will tend to move rearwardly. Suitable anti-rotation means for motor 8 are provided in the form of (FIG. 2) a plurality of elongated circular cross section rods 20 which are suitably rigidly secured, such as by welding, in arcuate spaced relationship to the inner surface of shell 2. Rods 20 extend longitudinally throughout shell 2 and, as shown, are spaced 90 degrees apart. The number of rods 20 provided will vary depending on the tendency of the motor 8 to rotate within shell 2. In cross section (FIG. 2) drill motor 8 has various external bosses 22 which are encompassed throughout their length by suitable channels 24 having a U-shaped cross section and which channels 24 are suitably rigidly secured, such as by welding, to the motor housing 14. Channels 24 are provided to adapt an existing peripheral contour of drill motor 8; however, such channels 24 would not be required when a motor housing 14 is initially designed and fabricated for insertion in a shell 2. As shown, rods 20 are intermediate bosses 22 and the sides of the channels 24 extend generally radially with respect to axis X—X to form abutment surfaces hereafter referred to an channel side 25 for the various portions of pad 18. Pad 18 has various axially extending portions which have suitable openings to permit auxiliary structures to be connected to the drill motor 8. Accordingly, the cross sections of pad 18 will vary at various axial locations with respect to shell 2. With respect to the cross section of FIG. 2, pad 18 has in the fourth quadrant (the quadrants being identified by I, II, III and IV) a portion 26 extending between the lower rod 20 and the lower right channel 24 with the uppermost portion of quadrant IV not having any portion of pad 18. Similarly a portion 28 of pad 18 extends between the upper rod 20 and the upper right channel 24 with the lower most portion of quadrant I not having any portion of pad 18. The open portions of quadrants I and IV (i.e. not having a portion of pad 18 therein) are to permit air connections to be made to motor 18. The II and III quadrants of FIG. 2 have positions of pad 18 extending between adjacent, but spaced, rods 20 and channels 24. Although open portions between motor housing 14 and shell 2 are shown in FIG. 2 axially displaced portions from said open portions will have portions of pad 18 therein. Thus, to the extent feasible the housing 14 is encompassed by the pad 18 and maintained in inwardly spaced relationship to the interior of shell 2 by the pad 18.

With such structure of pad 18 the vibrations of the drill motor 8 during operation will be transmitted to the pad 18 and, due to the deformability of the resilient material of pad 18, will be reduced in intensity externally of housing 1. Since pad 18 functions as a "noise deadening" material, the material of pad 18 is selected to have an optimum sound absorbing capability consistent with retaining the structural integrity of pad 18 with reference to all loads imposed on pad 18. Shell 2 and pad 18 are of a size with reference to the outer periphery of motor 8 to prevent the drill motor 8 from striking the interior of the shell 2 during vibration of drill motor 8.

Figure 5:
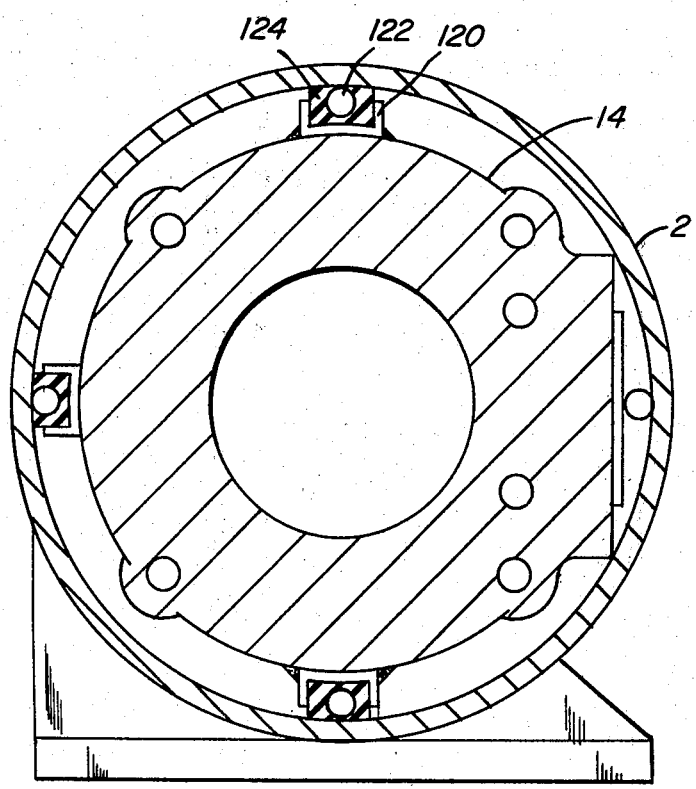
FIG. 5 is an alternate embodiment of the present invention.

In other embodiments of the present invention the front stabilizer and the rear stabilizer described below perform the function of the anti-rotational means. In all embodiments it is required that the anti-rotational means isolate torsional force of the motor 8 from the housing 1. In the embodiment illustrated in FIG. 5 the anti-rotation means comprises a plurality of rigidly secured channels 120 extending on the axial length of the motor. The channels have their sides oriented radially outward toward the rigid housing. The rigid housing has stops 122 projecting radially towards the motor and the stops 122 are captured by the channel sides. Torsional force isolating material 124 is formed within the channels, preventing direct contact of the channel sides with the stops. As will be readily apparent to those skilled in the art the anti-rotational means and the means for maintaining the motor in a spaced relationship with the housing is often performed by the same members.

Although drill motor 8 may be either hydraulically or pneumatically driven, the pneumatic drill motor 8 presents the more difficult noise control problem due to the need to handle the exhaust air from the drill motor 8. Accordingly, the drill motor 8 shown in FIG. 1 is a pneumatic motor having circumferentially spaced exhaust ports 30 forwardly adjacent the rearward end of drill motor 8. A series, illustratively five, annular baffles 32 are suitably secured to the exterior of motor housing 14 in axial spaced relationship forwardly of ports 30. Each baffle 32 has a suitable plurality of openings 34 extending axially therethrough to suitably reduce the pressure of the exhausting gas. Accordingly openings 34 may be staggered circumferentially in accordance with good muffling practice to obtain non-line of sight travel of the exhaust gas as it flows axially forwardly through the baffles 32. In order to prevent the exhaust gases from flowing rearwardly of housing 1, which is towards a normal operating position for the operator, a formed guide baffle 36 is suitably secured to the outer periphery of drill 8 and extends, in the form of a forwardly extending arc, to the interior surface of shell 2 and the rearward surface of the rearmost baffles 32 to form a chamber 38 therebetween. The outer periphery of baffles 32 also abut the interior of shell 2; however, it will be noted that the cross section of FIG. 1 shows that the baffles 32 and 36 engage rods 20 in the areas of the rods 20. With such structure exhaust gases exit through ports 30 to chamber 38 and flow serially forwardly through the baffles 32 to the rearward end of pad 18. Pad 18 is formed to provide elongated axially extending open ended circumferentially spaced passageways 40 between the pad 18 and the exterior surface of housing motor 14 to permit the exhaust gases to flow forwardly of the forward end of drill motor 8. A certain amount of the exhaust gases will also flow through the open area between rods 20 and housing 14. The cross section of passageways 40 is selected to provide the proper volume of exhaust gas flow in conjunction with the open area referred to.

The forward end of striking bar 16 is suitably coupled by a coupler 42 to the rearward end of a drill rod 44 to permit the motor 8 to deliver impact blows to drill rod 44 in a well known manner. Front plate 6 has a central opening 46 therein to permit the coupler 42 to extend freely axially therethrough. Front plate 6 abuts the forward end of shell 2 and is abuttingly secured thereto by suitable vibration resistant nuts 47 received on the forwardly threaded ends of rods 20 which extend through plate 6. Front stabilizer means 47 are provided within the formed housing 1 in front at the drill motor 8 to support the drill motor 8 within said formed housing. The front stabilizer means 47 comprises a resilient pad 50, a formed pad 52 within a tubular retainer 48. The inner tubular retainer 48 coaxially encompasses striking bar 16 and extends rearwardly from plate 6 to receive a sound deadening or absorbing structure consisting of a resilient pad 50 and a formed pad 52. Retainer 48 is rigidly secured to plate 6 in any suitable manner such as by welding. Pad 50 is an annular member which abuts the rearward surface of plate 6 and has a central opening therein to permit pad 50 to be deformed. Pad 52 is a sound absorbing member which has a central opening to permit striking bar 16 to extend therethrough and an outer cylindrical surface which abuts the inner circular surface of retainer 48. The rearward surface of pad 52 is formed to the forwardly facing contour of the motor housing 14 and has a forward surface which abuts the rearward surface of pad 50. Plate 6 has a plurality of circumferentially spaced passageways 54 angularly extending therethrough to permit the exhaust gases forwardly of drill motor 8 to exhaust to atmosphere. Accordingly, the inner ends of passageways 54 are radially outwardly of retainer 48 and the central axes of passageways 54 are inclined toward the axis X—X. If desired, a suitable plenum chamber 56 can be provided forwardly of front plate 6 for receiving the exhaust gases prior to the gases being exhausted through a forwardly facing exhaust opening 58 in chamber 56 surrounding the coupler 42. Such directed exhaust gas flow is desired when the exhaust gases are to be used in a shrouded drill rod structure. Chamber 56 can be of any suitable configuration, illustratively a cylindrical cross section, and is rigidly secured to the front plate 6, in any suitable manner such as by being welded thereto.

A rear stabilizer means 57 is provided within said formed housing 1 in the rear of the drill motor 8 to support the drill motor 8 within said housing 1. The rearward end of motor 8 has a rearwardly extending boss 59 with an internally threaded bore 60 having a central axis coincident with the longitudinal central axis of drill motor 8. A rear stabilizer 62 comprising an annular plate 64 which engages the rearward surface of drill motor 8 and a rearward formed annular plate 66 having a forward surface abuttingly engageable with the rearward surface of plate 64. Plate 66 is substantially thicker (FIG. 1) than plate 64 and is provided with a central recessed bore 68 for receiving a formed anchoring nut 70. Nut 70 also extends through plate 64 and has a threaded forward end which threadedly engages the threaded bore 60 to clamp plates 64 and 66 together and to force the plate 64 into engagement with the rearward end of drill motor 8. As shown, bore 68 is of a configuration so that the rearward end of nut 70 is recessed forwardly therein. The radially outer portion of plate 66 (with reference to X—X) is recessed to provide a radially outwardly extending flange portion 72 having the same outer diameter as plate 64. An annular sound absorbing member 74 encompasses plates 64, 66 and extends from the inner surface of shell 2, with appropriate axial through openings for rods 20, into the outer recess of plate 66 such that the radially inner end of member 74 is clamped between the flange portion 72 and the outer end portion of plate 64 when nut 70 is properly anchored in bore 60. Member 74 is of any suitable material with as an elastomeric material.

A pneumatic mount 76 is located between stabilizer 62 and back plate 4 which can be of various suitable structures with the one illustrated comprising a front plate 82, a pneumatic chamber formed by a cup shaped resilient member 80 and a back plate 78. Plate 78 abuts the inner forwardly facing surface of plate 4 and is closely received within shell 2 (appropriate openings being provided for rods 20). Plate 82 abuts the rearwardly facing surface of stabilizer 62 and has a central opening therein through which a threaded stub 84 extends rearwardly which stud 84 is suitably rigidly supported by nut 70 such as by stud 84 being threaded therein as shown. The central axis of stud 84 is coincident with axis X—X. Member 80 has a forward portion 86 of reduced radial extent (with respect to the rearward portion 88) thereof (with respect to X—X).

Forward plate 82 is secured to stud 84 via a suitable attachment 90 with the rearward end of the rearward portion 80 sealed to the forward surface of plate 78. A suitable passageway extends through portion 80 which carries a suitable air valve (not shown) which pressurized air can be selectively supplied to mounting 76. Also, if desired the air valve can be mounted for access externally of housing 1. As shown, suitable metallic reinforcing coils 94 encompass the chamber formed by portion 80 to prevent portion 80 from being excessively deflected radially but allowing considerable deflection axially (with reference to X—X). Rear plate 4 abuts the rearward end of shell 2 and has suitable openings to permit the rearward threaded ends of rod 20 to extend therethrough. Nut 47 threadedly engage the rearward threaded ends of rods 20 to form a rigid housing 1.

In view of the prior description of the manner in which pad 18 is constructed and placed on drill motor 8 the assembly of the complete enclosure will be obvious to one skilled in the relevant art and a complete description of such assembly is not warranted to fully understand the invention. When assembled (as illustrated it will be noted that the drill motor 8 is coaxially supported with shell 2 by the rear stabilizer 62 and the front stabilizer consisting of pad 52, retainer 48 and front plate 6). Pad 52 and member 76 are provided with ample room to permit their deformation so that upon vibration of motor 8 the motor deforms member 76 and pad 52 to reduce the vibrations transmitted to the housing 1. Since air chamber 76 can have various pressures the optimum stiffness of the material behind the drill can be determined, and a suitable one piece mounting of equal stiffness can be selected.

In assembling the drill enclosure all of the nuts 47 are torqued to axially force the components into engagement with each other to form a rigid housing 1. In so torquing the housing 1, pad 50 is selected of a material to permit its deformation without unduly stressing pad 52. Such a deformable connection between pad 52 and front plate 6 is also desired in order to absorb the forces placed upon the front plate 6 by the motor housing 14 via pad 52 when retracting the drill rod 44 from a hole. The above force occurs when the rock drill is retracting the drill rod 44 from a hole that the drill rod 44 is stuck in. Manufacturing tolerances of the components of housing 1 are compensated for by the deformability of mount 76 at the rearward end of housing 1.

In drilling on a drill rod 44 the drill motor 8 will, due to reaction forces, tend to move rearwardly. Such tendency to move rearwardly is resisted by the mount 76, which, due to its inflatable nature can be pressurized to any number of suitable pressures to provide a selected variable force to oppose any rearward movement of drill motor 8. Further, the rearward forces applied to mount 76 will cause mount 76 to deform but maintain drill motor 8 out of contact with housing 1 so that no misuse in opposing the movement of the motor 8 is created. During either forward or rearward movement of drill motor 8, baffles 32 and 36 will slide along the inner surface of shell 2 and along rods 20. Member 74 will slide in the same manner upon any axial movement of drill motor 8.

In addition motor 8 will tend to rotate within housing 1 during operation. Pad 18 provides the principal means to oppose such rotation without creating any substantial noise. Since the rotation of striking bar 16 is reversible, the drill motor 8 will tend to rotate in either direction, i.e. clockwise or counterclockwise with reference to FIG. 2.

Upon clockwise rotation of drill motor 8 with reference to FIG. 2, the lower right hand portion 26 of pad 18 will be urged in a clockwise manner with drill motor 8 due to the fact that portion 26 is caught between channel side 25 and rod 20 and a substantial engagement force exists therebetween.

Clockwise movement of portion 26 will force it into engagement with the lower rod 20 which, since rod 20 is rigid, further clockwise rotation of portion 26 will be prevented. Should drill motor 8 continue to force portion 26 clockwise, portion 26 will deform to increase its engagement force with drill motor 8 to further retard the clockwise movement of drill motor 8. Upon counterclockwise movement of motor 8, portion 28 will move counterclockwise and be forced into engagement with the channel side 25 in the I quadrant. In the other quadrants, the other portions of pad 18 will react with rods 20 and channel sides 25 in a similar manner to distribute the load caused by rotational movement of drill motor 8.

Although some frictional forces may be created by portion 26 between shell 2 and motor housing 14, the engagement with channel side 25 is dependent upon to oppose the rotation of drill motor 8. The engagement of channel side 25 by portion 26 is primarily to resist rotational movement of portion 26 on the outer surface of motor housing 14. During rotation the portions of pad 18 in the applicable quadrants will engage the rods 20 to primarily oppose the rotation of drill motor 8. As will be apparent to those skilled in the art further description of the operations of such portions is not necessary for an understanding of this invention.

In other embodiments, member 74 is also subjected to rotational forces which forces will, if sufficient in magnitude, also force the sides of the openings in member 74 through which rods 20 extend into engagement with opposite longitudinal sides of rod 20 to resist the rotation of motor 8. Pad 52 is likewise subject to rotational forces due to the rotation of drill motor 8, however, engagement with positive displacement arrestors, such as the rods 20 as heretofore described, is not necessary. If desired pad 52 can be provided with axial extending openings in its outer periphery to engage positive steps rigidly carried to the inner surface of retainer 48.

With the structure as heretofore described in FIG. 1 the drill motor 8 is supported for piped operation within the housing 1 such that regardless of what motion the motor 8 has within housing 1 the motor 8 does not create any additional noise by striking any part of the housing 1 so that the housing 1 can reduce the noise level emanating from motor 8 which is created during normal operation.

Figure 3:
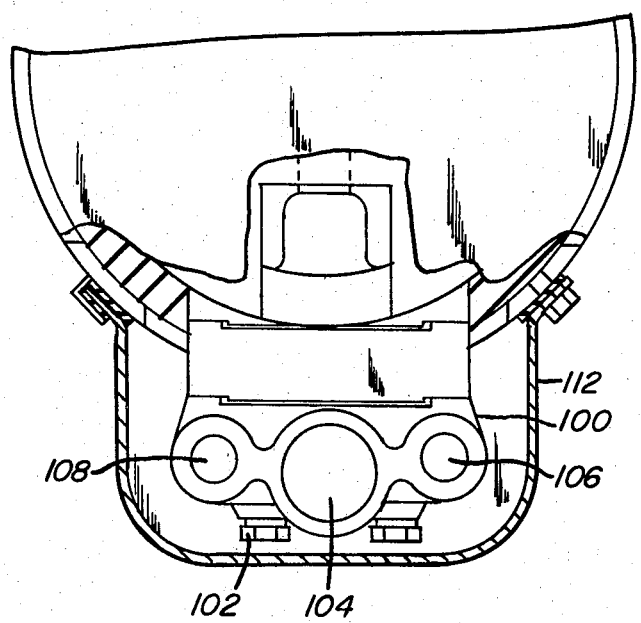
FIG. 3 is an end view of the structure shown in FIG. 1 with portions thereof being broken away and shown in cross section to more clearly illustrate the structure thereof.
Figure 4:
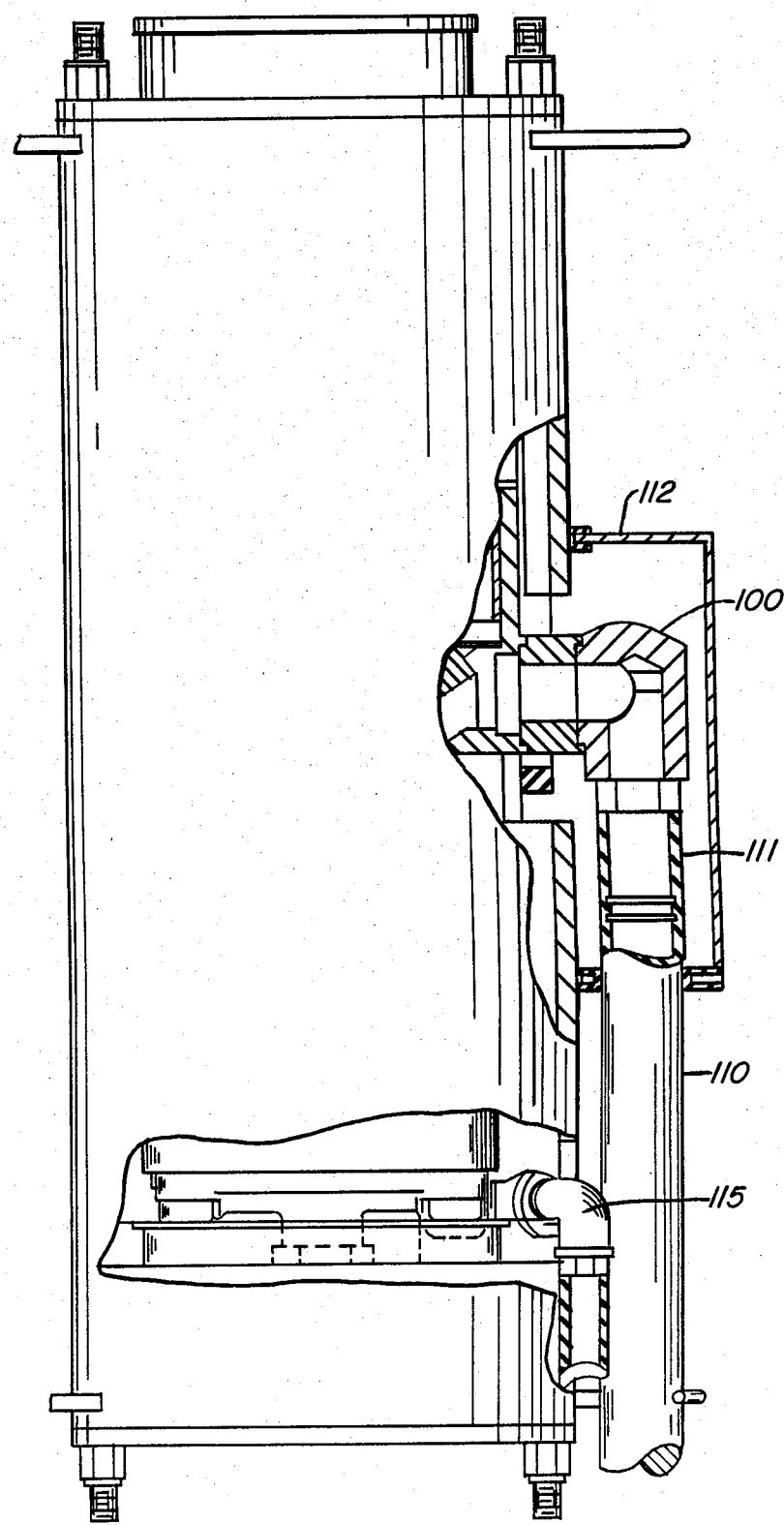
FIG. 4 is a plan view of the structure shown in FIG. 3 with portions thereof being broken away and shown in cross section to more clearly illustrate the structure thereof.

For normal operation of drill motor 8, it is necessary to provide air to drill. Motor 8 has a known type manifold 100 (FIGS. 3, 4) suitably rigidly secured thereto such as by bolts 102 which extend outwardly through shell 2 so that the air connections can be made to the manifold 100 externally of the shell 2. As shown, FIG. 3, manifold 100 has a center connection 104 for air to the hammer piston of the motor 8, a connection 106 for forward rotation air to the motor 8 and the connection 108 for reverse rotation air for motor 8. Normally employed resilient hoses 110 and 111 are connected to connections 104 and 106 respectively. (Hose from 108 not shown) A manifold cover 112 extends about the manifold 100 and the hoses are connected inside to minimize the noise emanating from the drill motor 8. Manifold cover 112 is gasketed with respect to the housing and hoses 110 in a known manner to minimize any noise from the manifold 100, however, the connection of the manifold to the drill 8 is in a conventional manner and does not form a part of this invention. Similarly, a water connection 115 is made to the motor 8 in a conventional manner with conventional gasketing being employed to minimize any noise transmission through such connections.

Although a preferred embodiment of the invention as presently contemplated has been described and shown, those skilled in the art to which this invention relates will readily discern that modifications of this invention can be utilized in various ways without departing from the spirit and scope of this invention as set forth in the following claims.

What is claimed is:

1. A noise dampening rock drill motor enclosure comprising:
 a rigid formed housing which encloses a drill motor, said housing having a shell, said shell having a first end and a second end;
 anti-rotation means provided within said shell for preventing rotation of said motor within said housing;
 said anti-rotation means isolating torsional force of the motor from said formed housing;
 a first stabilizer means provided at said first end of said shell capable of vibrationally isolating and supporting one end of said motor within said shell;
 a second stabilizer means provided within said shell capable of vibrationally isolating and supporting the motor within said second end of said shell; and
 a blanket formed of a resilient material at least partially circumferentially encompassing said motor, said blanket having sufficient strength to maintain the motor in a spaced relationship with the interior of said shell whereby said blanket functions as a noise deadening material.

2. An apparatus as recited in claim 1 wherein said motor used is pneumatically driven and said formed housing contains means for muffling the exhaust from said drill motor.

3. An apparatus as recited in claim 1 wherein said shell is generally cylindrical and has a first closure plate at said first end thereof and a second closure plate at said second end thereof to form a tubular chamber.

4. An apparatus as recited in claim 2 wherein said shell is generally cylindrical and has a first closure plate at said first end thereof and a second closure plate at said second end thereof to form a tubular chamber.

5. An apparatus as recited in claim 2 wherein said blanket is a pad which is formed to provide elongated axially extending open ended circumferentially spaced passageways between said pad and said motor to permit exhaust gases to flow toward said one end of said motor.

6. An apparatus as recited in claim 2 or 4 wherein said means for muffling the exhaust from said drill motor comprises a series of annular baffles suitably positioned within said enclosure in axial spaced relationship with the exhaust ports of said drill motor, said baffles having a suitable plurality of openings extending axially therethrough to suitably reduce the pressure of the exhaust.

7. An apparatus as recited in claim 6 wherein said means for muffling the exhaust also has a guide baffle positioned within said shell, said guide baffle capable of directing said exhaust toward said first end of said shell.

8. An apparatus as recited in claim 1 wherein a pneumatic mount is provided between said second stabilizer means and said second closure plate.

9. An apparatus as recited in claim 8 wherein pressurized air may be selectively supplied to said pneumatic mount.

10. An apparatus as recited in claim 3 or 4 wherein the anti-rotation means comprises a plurality of rods which are suitably rigidly secured to the inner surface of said shell, engaging a portion of said blanket.

11. An apparatus as recited in claim 10 wherein said motor has various external bosses which are encompassed throughout their length by suitable channels which are rigidly secured to the motor, and the sides of said channels engage said blanket to resist rotational movement of said blanket around the circumference of said motor.

12. An apparatus as recited in claim 3 or 4 wherein said first stabilizer means comprises a resilient pad which abuts a formed pad, said resilient pad abuts said first closure plate and said formed pad is formed to the shape of said motor for mating engagement therewith.

13. An apparatus as recited in claim 12 wherein said resilient pad and said formed pad outer surface abuts the inner surface of a retainer formed on said first closure plate.

14. An apparatus as recited in claim 3 or 4 wherein a passageway is provided in said first closure plate to permit exhaust gases to exhaust to the atmosphere.

15. A noise dampening rock drill pneumatic motor enclosure comprising:
a formed housing comprising an elongated outer shell having a first closure plate and a second closure plate to form a tubular chamber;
a first stabilizer means provided within said formed housing at a first end thereof to support the motor within said housing, said first stabilizer means comprises a resilient pad, said resilient pad abutting said first closure plate, a formed pad which abuts said resilient pad, and an axially extending retainer attached to said first closure plate to position said resilient pad and said formed pad;
a blanket encompassing said motor formed of a resilient material having sufficient strength to maintain the motor in a spaced relationship with the interior of said formed housing, said blanket functions as a noise deadening material;
anti-rotational means provided within said formed housing for preventing rotation of the motor within said housing, said anti-rotational means comprises a plurality of rods which are suitably, rigidly secured to the inner surface of said shell, engaging a portion of said blanket;
a second stabilizer means provided within said formed housing at a second end thereof to support the motor within said housing;
a pneumatic mount provided between the said second stabilizer means and a second closure plate,; and
means for muffling the exhaust from the drill motor said means having a series of annular baffles suitably secured to the exterior of the drill motor in axial spaced relationship with the exhaust ports of the drill motor each said baffle having a suitable plurality of openings extending axially therethrough to suitably reduce the pressure of the exhaust, and said means for muffling the exhaust has a guide baffle suitably secured to the outer periphery of said formed housing, said guide baffle capable of preventing the exhaust from flowing toward said second end of said formed housing.

16. A noise dampening rock drill enclosure comprising:
a rigid formed housing enclosing a drill motor;
anti-rotational means provided within said formed housing for preventing rotation of the motor within said housing, said anti-rotational means isolating torsional force of said motor from said formed housing;
a first stabilizer means provided within a first end of said formed housing to support and vibrationally isolate said motor within said housing;
a second stabilizer means provided within a second end of said formed housing to support and vibrationally isolate said motor within said housing; and
means for maintaining the motor in a spaced relationship with said formed housing.

17. An apparatus as recited in claim 16 wherein said first stabilizer and said second stabilizer perform the function of said anti-rotational means and means for maintaining the motor in a spaced relationship with said formed housing.

18. An apparatus as recited in claim 16 wherein said anti-rotation means comprises a plurality of stops attached to said housing capable of engaging a plurality of rigidly secured channels extending along the axial length of said motor, said channel sides are orientated radially outward toward said formed housing, said stops pointing radially inwardly from said housing toward said motor, stops are captured by said channel sides, and a torsional force isolating material formed within said channels, prevents direct contact of said channel sides with said stops.

* * * * *